United States Patent [19]

Abbott

[11] 4,380,344
[45] Apr. 19, 1983

[54] TRAILER HITCH CYCLE RACK

[76] Inventor: Frederick H. Abbott, Main St., East Princeton, Mass. 01517

[21] Appl. No.: 269,996

[22] Filed: Jun. 3, 1981

Related U.S. Application Data

[62] Division of Ser. No. 84,606, Oct. 15, 1979, Pat. No. 4,301,953.

[51] Int. Cl.³ .............................................. B60R 9/10
[52] U.S. Cl. .............................. 280/402; 224/42.03 B
[58] Field of Search ............... 280/402, 511, 512, 513, 280/477, 490, 491 A, 491 E, 415 A; 224/42.03 B, 42.06

[56] References Cited

U.S. PATENT DOCUMENTS

| 3,159,917 | 12/1964 | Whitehead | 280/477 X |
| 3,794,227 | 2/1974 | Stearns | 224/42.03 B |
| 4,054,302 | 10/1977 | Campbell | 280/477 |
| 4,065,147 | 12/1977 | Ross | 280/477 |
| 4,186,938 | 2/1980 | Youngblood | 280/402 |

FOREIGN PATENT DOCUMENTS

| 480880 | 8/1975 | Australia | 280/511 |
| 38139 | 1/1926 | Denmark | 224/42.03 B |

Primary Examiner—John A. Pekar
Attorney, Agent, or Firm—Charles R. Fay

[57] ABSTRACT

A cycle rack for a trailer hitch the construction being such as to easily mount and dismount the cycle rack at the same time allowing for the normal function of the trailer hitch.

2 Claims, 6 Drawing Figures

TRAILER HITCH CYCLE RACK

CROSS-REFERENCE TO RELATED APPLICATION

This application is a division of Ser. No. 84,606, filed Oct. 15, 1979, now U.S. Pat. No. 4,301,953.

BACKGROUND OF THE INVENTION

There have been many cycle racks proposed to be applied to vehicles and to trailer hitches, but in most cases such cycle racks are constructed in a way to interfere with or prevent the use of the hitch in a normal manner, and it is the object of the present invention to provide a new and improved cycle rack that is easily applied and dismounted and with which the trailer hitch may be used at the same time.

SUMMARY OF THE INVENTION

Trailer hitches comprise a ball (Class I and II) and some means of mounting the ball at the rear of the vehicle with the ball extending into position to be engaged and clamped by the trailer hitch clamp located on the trailer. A Class III hitch has a tubular receiver accepting a square shank on the trailer. The ball construction is taken advantage of in the present invention by applying to the plate on which the ball appears a socket or the like for receiving a simple bicycle rack. The socket may be vertical and located just to the rear of the ball on the plate that holds the ball or it may be horizontal and extend sufficiently above the ball so that the trailer hitch clamp may be attached to the ball.

In the case of a Class III hitch, a saddle socket is used to provide a receptacle for the bicycle rack support offset from the receiver.

The cycle rack comprises an upright tube or column having at its upper end a cross piece for carrying e.g., bicycles, together with a detachable socket member attached to the cross piece which can be lifted out of the upright member if desired.

On the other hand, for the horizontal socket, the column may have a foot at its lower end for entrance into the horizontal socket. In both cases it is preferred that lock pins be provided to insure against separation of the parts.

PREFERRED EMBODIMENT OF THE INVENTION

Figure 1:
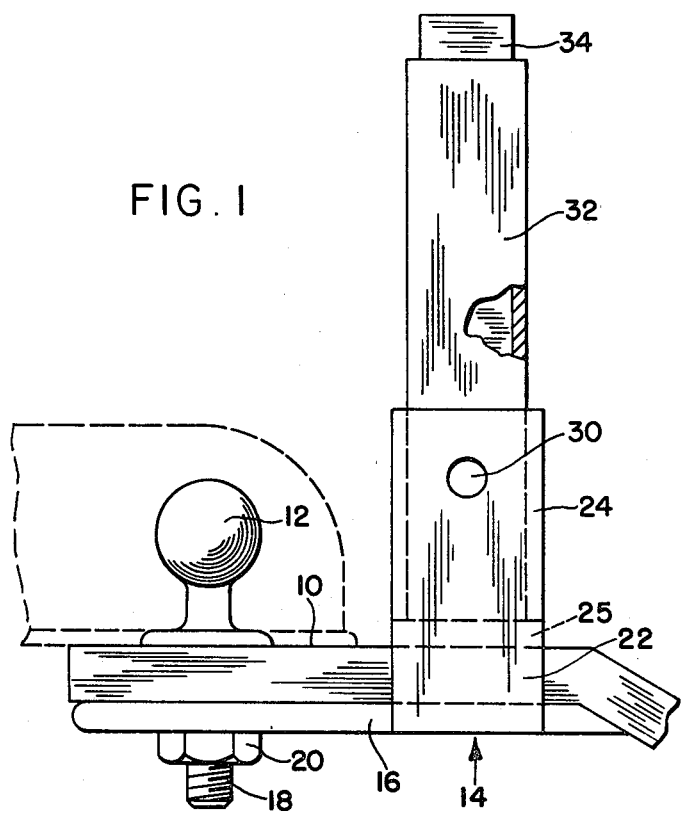
FIG. 1 is a side view of one form of the invention.
Figure 2:
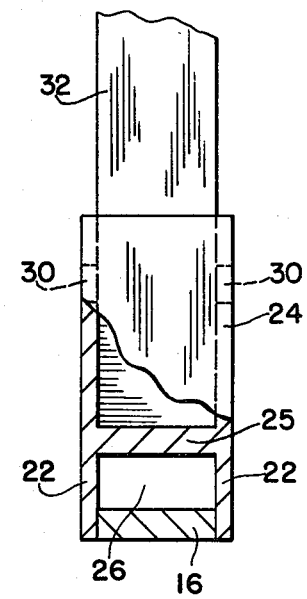
FIG. 2 is a front view thereof, partly in section.

As shown in FIG. 1 a hitch plate 10, which as usual is attached to the vehicle in the rear thereof in any way desired, is provided with the usual ball 12 mounted on the plate 10.

Also mounted on plate 10 there is a bicycle rack column adapter generally indicated at 14, this being attached in any way desired to plate 10. In the present case it is shown firmly attached by means of a mounting tongue 16 through which fastener 18 for the ball extends as well as through plate 10 and is secured as by nut 20 or the like. This plate has a pair of side walls 22 rising therefrom and forming part of an upright socket 24 that is open at the top. A partition 25 forms a horizontal opening 26 through which the base 10 is slid to the position shown.

At the upper portions of side walls 22 there are provided a pair of apertures 30, 30 for the reception of a locking pin.

With the parts in position as above described, a hollow bicycle rack column such as that at 32 supporting the rack 34 may be placed in the socket 24 and the column 32 has openings to coincide with those at 30, 30 for the reception of a locking pin to hold the column 32 in position.

It will be seen that the ball 12 is unencumbered in any way and can be utilized for the trailer hitch exactly as usual, and the bicycles are held on the rack 34 between the vehicle and the trailer.

Figure 3:
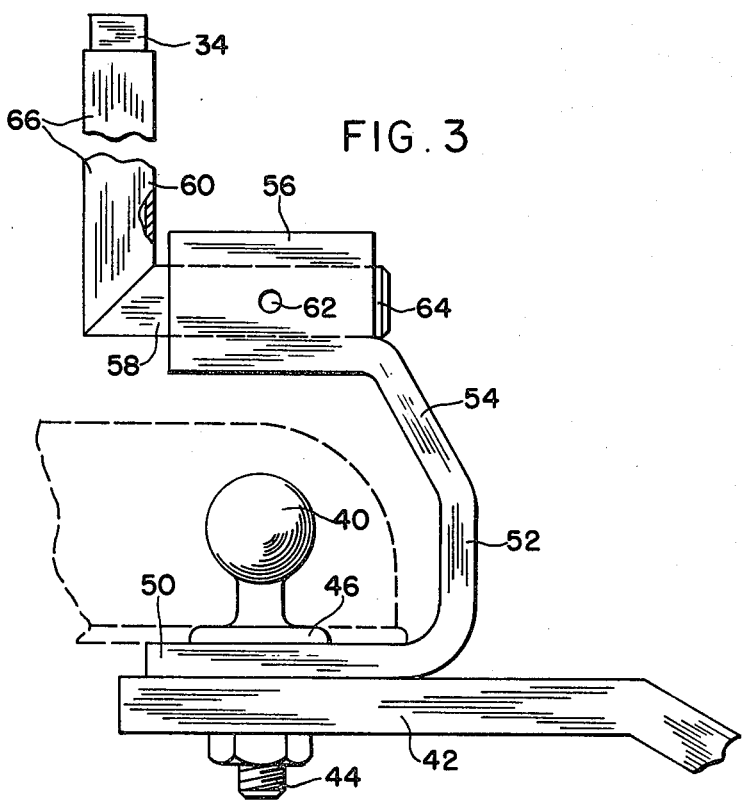
FIG. 3 is a side view of another form of the invention.

A modification of this device is shown in FIG. 3 wherein the ball 40, which is similar to that already described, is held to the trailer hitch plate 42 by a nut and bolt as at 44. The ball is provided with a collar or base 46 which abuts a foot 50 on a standard 52 spaced from ball 40 but extending forwardly as for instance at 54 and terminating in a horizontal socket 56. This socket has an opening 58 for the reception of another form of hollow bicycle rack column 60 and it also has an opening 62 for a locking pin.

The bicycle rack column 60 is adapted to be used with the horizontal socket 58 in FIG. 3 and is provided with a foot 64 with locking pin holes to match those at 62. The upright standard 66 may directly support a bicycle rack like that at 34 in FIG. 1.

It will be seen that the modification shown in FIG. 3 also leaves ball 40 free to be used in the usual manner with a hitch clamp.

Figure 4:
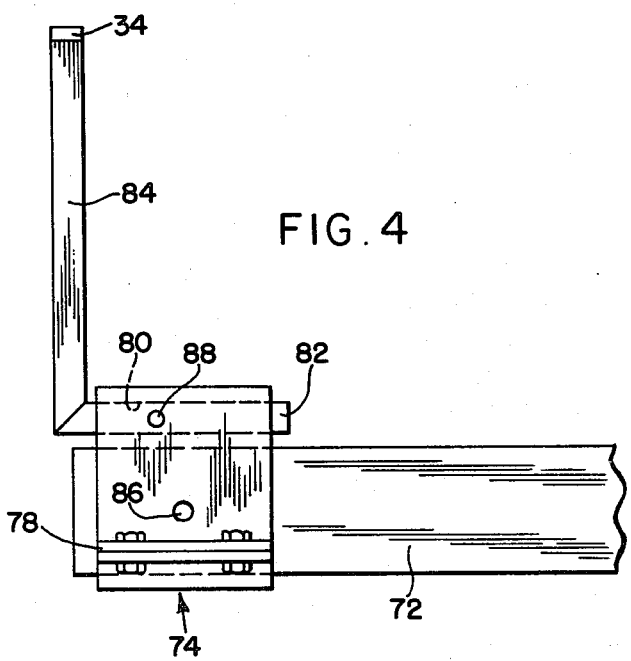
FIG. 4 is a side view of still another form of the invention.
Figure 5:
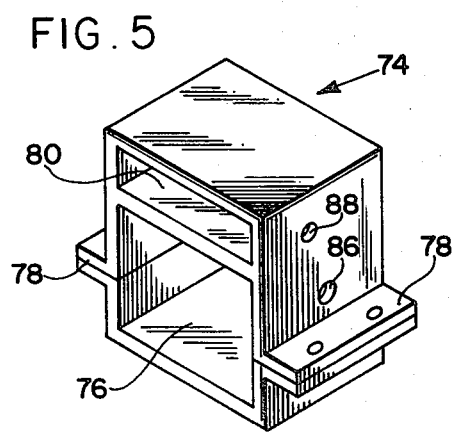
FIG. 5 is a perspective view of the saddle clamp of FIG. 4.
Figure 6:
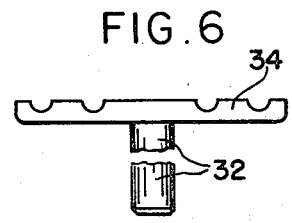
FIG. 6 is a view showing a rack.

Referring now to FIG. 4 there is shown the usual receiver 72 of a class 3 trailer hitch which is attached to the vehicle. On this receiver there is removably applied a saddle clamp generally indicated at 74. This saddle is generally rectangular and has a relatively large opening 76 to receive the receiver. It is in two parts for assembly and includes flanges 78 for securing the parts together to be clamped to the receiver. At its top portion there is another opening 80 which can receive the foot 82 of an upright hollow column 84 upon which the bicycle rack 34 is adapted to be supported. In this case the usual hitch for a class 3 receiver can likewise be used including the use of the locking pin 86 and the same type of pin 88 can be used in conjunction with foot 82 not only locking the trailer hitch but also locking the bicycle rack in position.

Once installed, no tools are needed to apply or detach the rack. Simply by pulling a single pin, the rack can be removed in a few seconds. The rack can be used to carry cycles with or without the use of the trailer in each of the three classes of trailer hitches.

I claim:
1. In combination with a trailer hitch for securing a power vehicle with respect to a trailer, said trailer hitch including a plate on the vehicle and a ball on the plate, that improvement which includes a support for a cycle rack located on said trailer hitch and leaving the hitch free of impediments so it can be used in the normal way,
said improvement comprising means forming a socket, means to connect the same with respect to one part of the trailer hitch, said socket being spaced from the operative parts of the hitch, a cycle rack, a depending column supporting said cycle rack, and means for securing said column at the lower end thereof with respect to said socket in upright condition of said column, said socket being horizontal and said column including a foot extending at an angle thereto for reception in said horizontal socket, means to attach the ball to the plate on the vehicle, and the socket forming means including a plate secured between the ball and the plate to which the ball is secured by the ball attaching means.

2. The combination of claim 1 wherein the socket forming means includes an upright portion terminating at its upper end in a horizontal portion which includes a part of the socket, the upright portion having the said socket forming means plate at its lower end.

* * * * *